June 10, 1924.
C. W. JOHNSON
1,496,809
THRUST BEARING AND METHOD OF MAKING SAME
Filed June 19, 1920
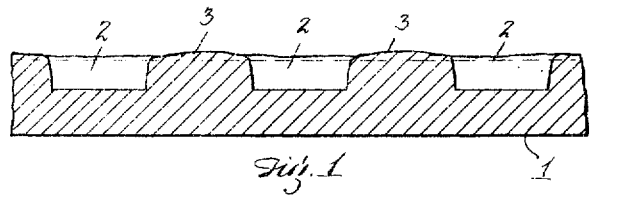
Fig. 1
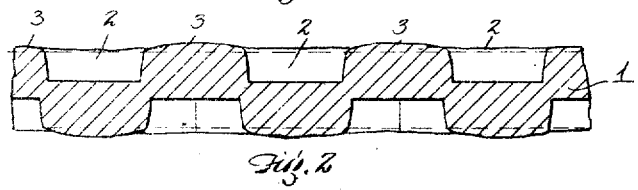
Fig. 2
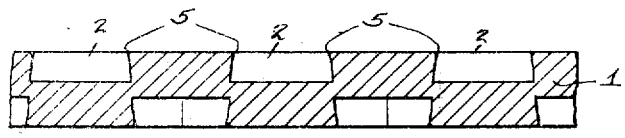
Fig. 3
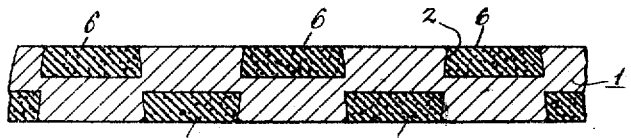
Fig. 4
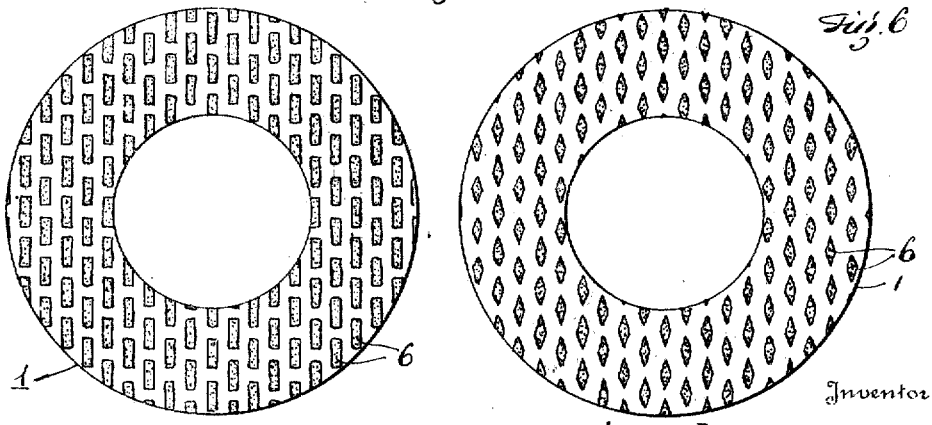
Fig. 5
Fig. 6
Inventor
Carl W. Johnson
By Day, Oberlin & Day
Attorneys Patented June 10, 1924.

1,496,809

UNITED STATES PATENT OFFICE.

CARL W. JOHNSON, OF CLEVELAND, OHIO, ASSIGNOR TO THE CLEVELAND GRAPHITE BRONZE COMPANY, OF CLEVELAND, OHIO, A CORPORATION OF OHIO.

THRUST BEARING AND METHOD OF MAKING SAME.

Application filed June 19, 1920. Serial No. 390,196.

*To all whom it may concern:*

Be it known that I, CARL W. JOHNSON, a citizen of the United States, and a resident of Cleveland, county of Cuyahoga, and State of Ohio, have invented a new and useful Improvement in Thrust Bearings and Methods of Making Same, of which the following is a specification, the principle of the invention being herein explained and the best mode in which I have contemplated applying that principle, so as to distinguish it from other inventions.

The present invention, relating, as indicated, to a thrust bearing and the method of making same, is particularly directed to an improved type of thrust bearing washer having improved bearing and lubricating qualities and to a method of producing the same from rolled strips of metal. One of the chief objects of the invention is the provision of an improved bearing of relatively inexpensive construction. To the accomplishment of the foregoing and related ends, said invention, then, consists of the means hereinafter fully described and particularly pointed out in the claims.

The annexed drawing and the following description set forth in detail one method and one product exemplifying my invention, such disclosed procedure and product constituting, however, but one of various applications of the principles of my invention.

In said annexed drawing:—

Fig. 1 is a longitudinal section showing a strip of rolled bearing metal after having been indented to produce a series of recesses in one surface of the metal; Fig. 2 is a similar view of the same strip showing the same after it has been indented on the reverse face to provide a second series of recesses; Fig. 3 is a similar view of the strip after having been sized to return it to its original thickness; Fig. 4 is a view similar to Fig. 3, but showing the strip after indentations have been filled with a lubricating composition; and Figs. 5 and 6 are side views of the complete bearing after having been formed into a circular washer.

My improved method of producing a thrust bearing consists in passing a strip 1 of bearing material, such as brass, bronze, or similar material, which has been rolled to harden it to a certain extent, between a series of rolls constructed to produce indentations 2 in one surface of the material. These indentations are formed to extend a little less than half way through the material, and the result producing the indentations is also to produce a series of raised lands between the indentations. The indentations are produced by passing the strip between rolls, one of which is smooth and the other is provided with a series of regularly arranged indenting teeth, such, for example, as are described in the co-pending application of myself and James L. Myers, Serial No. 390,188, filed June 19, 1920.

After the material has been passed through one set of rolls to produce indentations on one face it is passed through a second set of rolls which is similarly provided with indenting teeth on the roll which contacts the previously smooth side of the strip, and in this way a second series of indentations is produced on the reverse side of the strip, (see Fig. 2). It is important that the two series of indentations be differently arranged, that is, if the indentations on the two sides are in the same pattern then they should be staggered with respect to each other, or else a different pattern or arrangement of indentations should be employed on the two sides of the roll.

In the strip which I have shown it will be noticed from Figs. 5 and 6 that on one side of the strip I produce a series of straight parallel indentations, while on the other side I have formed a series of diamond-shaped indentations.

After the indentations have been formed on the two sides of the strip, the strip is sized by being passed between smooth faced rolls which will roll it down to its original thickness, (see Fig. 3), and this action serves to pinch in together the upper edges or corners 5 of the indentations, in this way forming dove-tailed recesses in the two surfaces of the bushing which serve to mechanically lock into these recesses the solid lubricant 6, which is filled into the recesses after the sizing. This solid lubricant is a composition consisting of graphite with a suitable binder.

After the strip has thus been indented, sized and filled with lubricant, bearing members of the desired size are cut from it, usually by stamping, and if there are washers such as are shown in Figs. 5 and 6, the strip is merely passed beneath the punch which stamps out annular disks of the desired size. For other purposes the articles are formed as may be desired by suitable means.

By this method it is possible to produce relatively thin, and hence, inexpensive thrust bearings, which are self-lubricating on both of their bearing surfaces, in such a way that the lubricant can neither be knocked out of the recesses in which it is held, nor can the bearing wear down except at the same rate as the bearing metal which surrounds it. The ratio between the area of the bearing metal surface and the recesses which contain graphite should be approximately 70 to 30.

It will be noticed by inspection of Figs. 5 and 6 that the patterns which are produced on the two sides of the strip are somewhat distorted from the original patterns and this is caused by the flow of the metal and by the fact that the indenting teeth which act upon the two sides of the bushing extend to almost one-half the thickness of the strip, and hence the production of the second operation will somewhat distort the shape of the original recess in the first face, while the sizing of the strip will still further distort all of the recesses on both sides.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. A thrust bearing comprising a thin metallic plate provided with a series of regularly arranged recesses in one face, and a second series of recesses in the opposite face, said second series of recesses being of a different pattern than said first series, and said recesses in the opposite faces being staggered with relation to one another so that no recesses in one series are directly opposed to the recesses in the other series.

2. In a method of making bearing plates, the steps which consist in working a relatively thin strip of metal to produce a series of regularly arranged indentations in one surface, working such strip to produce a differently arranged series of indentations in the other surface, the recesses on opposite sides being so arranged that no recess of either series will be opposite a recess of the other series, sizing said strip to return it to its original thickness, and then filling such recesses with a solid lubricant.

Signed by me this 14th day of June, 1920.

CARL W. JOHNSON.